United States Patent [19]

Heitz

[11] 4,180,272

[45] Dec. 25, 1979

[54] SEAL FOR SEALING BETWEEN TWO TELESCOPIC TUBES AND SEALING DEVICE USING SUCH SEAL

[75] Inventor: Pierre Heitz, Puteaux, France

[73] Assignee: Compagnie d'Etudes et de Realisations de Cybernetique, Fontenay-Sous-Bois, France

[21] Appl. No.: 942,907

[22] Filed: Sep. 15, 1978

[51] Int. Cl.$^2$ .......................... B65B 3/04; F16J 15/00
[52] U.S. Cl. ..................... 277/28; 277/34.3; 141/312
[58] Field of Search .............. 277/28, 30, 34, 34.3, 277/34.6, 226; 141/46, 287, 312

[56] References Cited

U.S. PATENT DOCUMENTS

| 1,319,464 | 10/1919 | Durbin | 277/34.3 X |
|---|---|---|---|
| 1,803,665 | 5/1931 | Dennis | 277/28 X |
| 2,369,823 | 2/1945 | Freed | 277/34.3 |
| 2,458,631 | 1/1949 | Parks | 277/34.3 X |
| 2,648,554 | 8/1953 | Gilbert | 277/34 |
| 3,103,958 | 9/1963 | Rath | 141/312 X |
| 3,951,684 | 4/1976 | La Prad et al. | 277/34.6 X |
| 4,068,852 | 1/1978 | Anglade | 277/34.3 |
| 4,082,298 | 4/1978 | Sanford | 277/34.3 |

FOREIGN PATENT DOCUMENTS 616799 1/1949 United Kingdom ............... 277/34.3

Primary Examiner—Robert S. Ward, Jr.
Attorney, Agent, or Firm—Haseltine, Lake & Waters

[57] ABSTRACT

A sealing device for sealing between two telescopic tubes which in one relative position come to rest one on the other, the device comprises an inflatable seal disposed between said tubes and means for supplying fluid to said seal to inflate said seal, which means is controlled by the force arising when one tube comes to rest and bears on the other tube. The means for inflating the seal may comprise a jack which is connected to the seal and subject to the weight of one of the tubes when it comes to bear on the other tube.

6 Claims, 3 Drawing Figures

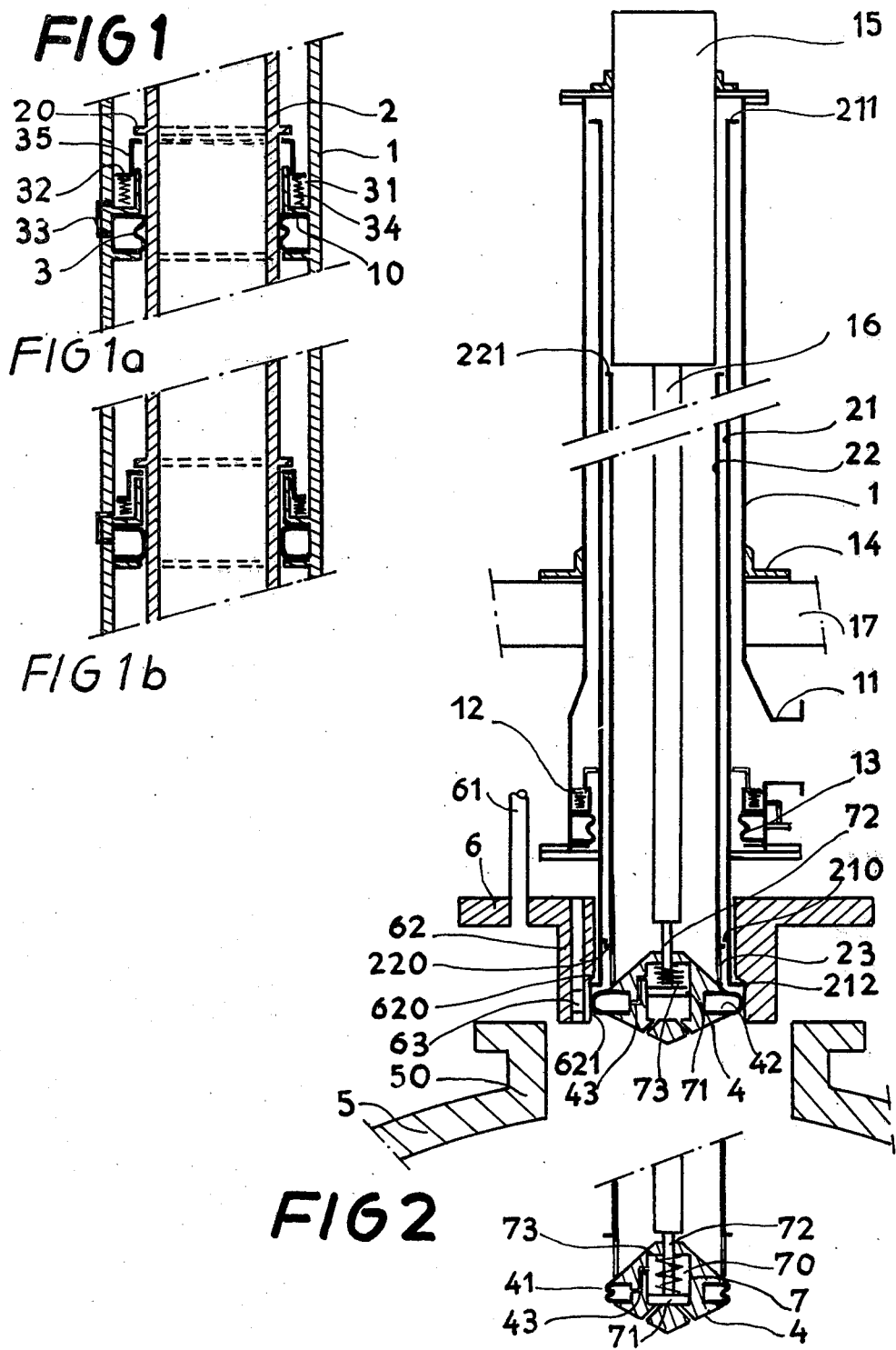

SEAL FOR SEALING BETWEEN TWO TELESCOPIC TUBES AND SEALING DEVICE USING SUCH SEAL

The invention relates to a seal for sealing between two tubes which are relatively slidable one on the other and an obturation device for closing the end of a conduit using the seal.

Axially displacable conduits comprising a fixed outer tube and a movable inner tube the two tubes resting, at the end of travel, one on the other, are used in various applications. To ensure sealing, a stuffing box can be used, but it has already been proposed to provide an inflatable seal in the annular space between the two tubes, which, when it is deflated, allows sliding of the inner tube, guiding it, if need be, and which ensures sealing, when it is inflated, by its application with force against the walls of the tubes.

Such a seal is generally inflated by a gaseous or liquid fluid under pressure and the installation can include an exterior system for inflating the seal.

The invention has for object a system for inflating such a seal which is particularly simple and cheap and which is automatically put into operation as soon as the tubes rest one on the other.

According to one aspect of the invention there is provided a sealing device for sealing between two tubes which are slidable one in the other and are movable to a position in which one said tube rests on the other said tube, comprising an inflatable seal disposed in an annular space provided between said two tubes; means for supplying fluid to said seal for inflating and applying said seal under pressure against the walls of said tubes; and means for controlling said means for inflating said seal directly by the force arising from the resting of said one tube on said other tube.

Preferably, the inner one of said tubes and the outer one of said tubes rest on each other through the intermediary of abutments, which may for example, be flanges, each integral with a respective tube and extending between said two tubes. In this example, said means for inflating the seal comprises at least one jack placed between said abutments and connected to the interior of said seal by a fluid supply conduit.

The invention has a particular application to installations for filling tanks with liquid products, the above described seal being adapted for use in an obturation device for the end of the filling conduit.

Such conduits generally comprise at least one tubular element which is vertically axially movable to enter the interior of the tank, this tubular element being connected by means suspension to control means for controlling its vertical displacement in the direction of descent into the interior of the tank and for its raising.

In many instances, the end of the conduit is closed by an obturation plate which has a conical shape so as to provide a conical distribution of the liquid, the latter issuing through lateral apertures provided in the conduit above the obturation plate.

To ensure that filling takes place under good conditions, particularly without the formation of froth, it is preferable that the end of the conduit be immersed in the liquid. Therefore, when the conduit is raised, it allows discharge of residual quantities of product which may be projected by the wind onto the top of the tank or the walls of the control cabin of the loading installation.

Devices have therefore been proposed for retaining the residual product flowing along the conduit, which generally consist of a rectractable hood which moves into place under the conduit when the latter emerges from the tank. These devices generally give satisfaction but have the drawback of only moving into place under the conduit when the latter has been raised above the orifice of the tank by a certain distance, which, depending on the dimensions of the tank, can be of the order of 1 to 2 meters. When there is wind, drops of product may consequently fall, during this unprotected travel, onto the tank or onto the access footbridges.

It therefore seems preferable to directly close the end of the conduit so as to prevent drops flowing out as soon as the conduit emerges from the orifice of the tank.

With this object in view, a cylindrical casing has already been used which is mounted to slide on the conduit and so as to come to rest, in a low position, on the obturation plate, closing the lateral apertures at the end of the conduit. The casing is halted by support abutments on the tank when the conduit enters the interior of the latter so as to free the lateral apertures. The casing is, furthermore, often mounted on a plate which, on descent of the conduit, obturates the orifice of the tank so as to prevent gases from issuing freely from the tank, the gases generally being progressively drawn up with filling.

In order that the prevention of drops be efficient, it is necessary that a seal be placed between the conduit and the casing. When the casing rests, in the low position and on raising of the conduit, on the obturation plate, the seal can be placed between the obturation plate and the part of the casing which rests on it. Nevertheless, the superposition of the casing on the obturation plate may not be perfect and may allow a certain quantity of liquid to pass.

It is an object of the invention to provide a device which ensures complete obturation of the end of the conduit.

In accordance with another aspect of the invention, there is provided a sealing device for sealing the lower end of a conduit for filling a tank with liquid and comprising at least one tubular element movable vertically along its axis; means for controlling the vertical displacement of said conduit; suspension means connecting said conduit to said control means; an obturation member closing the lower end of said conduit; lateral apertures defined in the lower end of said conduit for passage of of the liquid; and a cylindrical casing for closing said apertures, and slidable along said conduit between a closing position in which said casing rests on the end of said conduit and an opening position in which said casing rests on an exterior abutment; wherein said obturation member has a diameter less than the inner diameter of said casing, said casing rests, in said closing position, on an abutment provided at the lower end of said conduit, and said sealing device comprises an inflatable seal arranged on the periphery of said obturation member, means for inflating said seal to apply said seal to the inner wall of said casing and means for detecting an increase in the weight borne by said suspension means when said casing rests on said abutment of said conduit on raising said conduit and for controlling said means for inflating said seal.

In a preferred embodiment, said means for inflating said seal comprises a jack for supply of fluid, mounted on said obturation member and connected to the interior of said seal by piping.

The invention will now be described, with reference to particular embodiments, given by way of example only and illustrated in the accompanying drawings, in which:

FIGS. 1a and 1b show in open and closed position the operation of an embodiment of an inflatable seal according to the invention; and FIG. 2 represents diagrammatically, in axial section, a filling conduit fitted with an obturation device using a seal according to the invention.

FIGS. 1a and 1b show two tubes 1 and 2 which are slidable one in the other and are provided with flanges 10 and 20 which come into abutment one on the other at the end of sliding when one tube rests on the other.

An inflatable seal 3 is provided to seal the gap between the two tubes. The seal 3 comprises a hollow annular casing fixed on the tube 1 below the flange 10, which casing, as is well-known, can be retracted, as shown in the FIG. 1a, to allow free sliding of the inner tube 2, and is applied to the wall of tube 2 to ensure sealing by inflating it, as shown in FIG. 1b.

Generally this type of seal is connected to an exterior supply circuit, which is hydraulic or pneumatic, which is put under pressure when it receives a command signal given, for example, by an electrical contact switch or manually by an operator.

This type of circuit therefore necessitates a relatively complex installation which may be subject to failure and which is often only justified when, with other objectives, a hydraulic or pneumatic circuit is required for other purposes.

The system for inflating the seal according to the present invention has the advantage of being capable of being simple, not very bulky and reliable.

It comprises a jack which is placed between the abutment flanges of the tubes. In the present embodiment it comprises an annular chamber 31 provided above the abutment 10 and closed by an annular piston 32. The chamber 31 is connected to the interior of the seal by piping 33 for supply of fluid for inflating the seal.

The piston 32 is fast or integral with a sleeve joint 35 whose upper part forms the abutment on which the abutment 20 comes to rest at the end of sliding, which determines the depression of the piston 32 and the transfer of a corresponding quantity of fluid into the seal 3 which inflates.

The depression of the piston 32 stops when the pressure of the inflating fluid balances the force applied to the abutment 20, generally corresponding to the weight of the tube 2.

When the tube 2 is raised, the pressure in the seal falls, freeing the tube 2. A spring 34, placed in the chamber 31, raises the piston 32 which has the tendency to return its initial position. The inflating fluid is drawn back again into the chamber 31 and the seal 3 retracts, and returns to the position shown in FIG. 1a.

The device is obviously autonomous and not very bulky since it can be placed in a simple enlargement of the tube 1.

The seal which has just been described has various applications and can be used if there is a reason for establishing a seal between two tubes sliding one in the other. It clearly is a matter of a relative movement and the two tubes can also be displaced together, the displacement of the seal posing no problem since it is autonomous. Furthermore, the outer tube could be provided by a fixed cylindrical housing surrounding the inner tube over a small axial distance.

The inflatable seal, the operation of which has just been described, has particular application in the case of a telescopic conduit for filling a tank.

FIG. 2 shows such a conduit which is vertically mounted for sliding movement in the interior of a fixed column 1 whose base can be connected by a pipe 11 to an installation (not shown) for supplying a fluid such as a hydrocarbon. The conduit comprises two tubes 21, 22, which are telescopically slidable one in the other.

On the upper part of the column 1 there is mounted a jack 15 for control of the vertical displacement of the conduit, the conduit being suspended from the rod 16 of the jack.

The lower end of the inner tube 22 of the conduit is closed by an obturation member or plate 4 whose upper part is cone-shaped with the apex directed upwardly, so as to laterally disperse fluid introduced into the conduit, the fluid flowing out through lateral apertures 23 in the lower end of the tube 22. The tube 22 is fixed to or simply rests on the obturation plate 4. The outer tube 21 is provided at its lower end with abutments 210 which rest on corresponding abutments 220 provided at the lower end of the tube 22 so that both the tubes, when tube 22 has been retracted inside tube 21, are supported by the rod 16 of the jack through the intermediary of the obturation plate 4.

When the jack 15 is operated, the two tubes descend simultaneously until abutments 211 provided in the upper part of the tube 21 come to rest on a flange 12 arranged on the lower part of the column 1 and under which is preferably disposed an annular seal 13 of the stuffing box type or an inflatable seal, capable of ensuring sealing between the column 1 and outer tube 21, so that the fluid entering the conduit by the pipe 11 goes directly into the tube 21. As is shown in FIG. 2, the inflatable seal if provided can be operated as described above by the resting of the abutment 211 on an annular jack placed below the flange 12.

Descent of the tube 21 being thus halted by the abutments 211, the tube 22 continues to descend until abutments 221 provided on its upper part come to rest on the abutments 210 provided on the lower end of the tube 21. The jack 15, most importantly, forms a means of controlling the speed of descent of the tubes, the latter being principally driven by their weight. The column 1 being mounted, through the intermediary of a flange 14, on a fixed framework 17, overhanging the tank 5 to be filled, it is therefore possible to control the descent of the conduit into the interior of the tank 5 which is provided with an orifice 50.

To prevent vapours emitted on filling diffusing around the tank, the conduit is associated, or is fast or integral, with a closing plate 6 capable of being applied to the edge of the orifice 50 so as to seal the latter and at which, generally, a conduit 61 for evacuation of the gases is connected. To allow introduction of the conduit into the interior of the tank, the closing plate 6 is fixed to a casing 62 which is mounted to slide along the conduit, the outer tube 21 of the conduit being provided with abutments 212 on which the casing 62 can rest through the intermediary of corresponding abutments 620 on the casing 62. When the conduit is raised, the closing plate 6 and the casing 62 are in a low position resting on the lower end of the conduit, the casing 62 extending over and covering the lateral apertures 23 of the inner tube 22. When the conduit is lowered, the closing plate 6 rests on the edge of the orifice 50 and thus stays in a high position while the tubes 21 and 22 continue to descend, the lateral apertures 23 then being uncovered.

The casing 62 may be fitted with a probe 63 for generating an alarm signal in the event of excessive filling of the tank. The probe may advantageously be constituted by an ultrasonic transceiver; in the event of the level of the liquid reaching the lower part of the casing, the total attenuation of the reflected ultrasonic beam could determine the triggering of a relay controlling the closing of a loading valve.

In its low position the casing 62 thus rests on the abutments 212 of the outer tube 21 and not on the obturation plate 4, the latter having a diameter substantially less than the inner diameter of the casing 62 so that it can be received by the casing. In this way, it is possible to place an inflatable annular seal 41 in a groove 42 in the periphery of the obturation plate 4. The means for controlling inflating of the seal is of the same kind as that described above.

The inflatable seal 41, when it is deflated, is returned to the interior of the groove 42 and, as a result, does not hinder the introduction of the obturation plate 4 into the casing 62 on raising of the conduit. As soon as there is an increase in the weight borne by the jack 3, at the moment when, at the outlet of the orifice 50, the casing 62 is picked up by and rests on the tube 21, inflating of the seal 42 takes place, the seal thus being applied against the inner wall 621 of the casing 62 and effecting a seal at the lower end of the conduit. Indeed, the inflatable seal, because it is subject to a radially applied force and bears on a coaxial cylindrical wall, works under optimum conditions.

The drops of liquid which flow along the inner and outer walls of the tubes 21 and 22 are thus halted by the seal 41 and the casing 62, the height of the latter being normally sufficient to contain the residual quantity of the product.

The operation of the device is thus based on the immediate inflation of the inflatable seal as soon as the casing 62 is picked up by the conduit on the raising of the latter. The invention also has for object a very simple and not very bulky device allowing ensuring of the inflating of the seal with total reliability.

The interior chamber of the inflatable seal 41 is connected by piping 43 to the chamber 70 of a jack 7 for control of the supply of fluid to the seal. The jack 7 is normally single-acting, its active chamber 70 being situated above the piston 71 and traversed by the piston rod 72. The piston rod 72 is fixed to the end of the rod 16 of the control jack 15 and the piston 71 is urged against the bottom of the chamber 70 by a compression spring 73 which is rated so as to offset the weight of the tubes 21 and 22. Consequently, the jack 7 behaves like a balance, the piston 72 being at the bottom of its stroke when the obturation plate 4 only supports the two tubes 21 and 22 of the conduit.

When the conduit comes out of the orifice 50 and picks up the casing 62 and the closing plate 6, the spring 73, which then bears a weight greater than that for which it has been rated, is compressed and the piston 71, raised by the rod 16, is displaced into the interior of the chamber 70. A certain quantity of fluid flows through the piping 43 into the seal 41 which inflates and is applied against the inner wall 621 of the casing 62. When the pressure in the seal 41 and in the chamber 70 is such that it balances the extra weight of the casing 62, the piston 71 ceases to be displaced in the interior of the chamber 70 and the obturation plate 4, which stayed on the same level throughout the inflation of the seal, is raised again by the jack 3, carrying along the telescopic tubes and the casing 62.

It can be seen that operation is entirely reliable since the casing 62 and the closing plate 6 are not raised if the inflatable seal is not completely applied. The pressure of application, which is radially exercised, that is to say under optimum conditions, is moreover not limited to the extra weight of the casing 62, as a reduction effect can be obtained operating on the relative sections of the interior chamber of the seal and of the active chamber of the jack 7.

Of course the invention is not intended to be limited to the details of the embodiments which have just been described, the latter being capable of forming the object of variants, and the principle of the invention can be applied by eqivalent means.

The device according to the invention is particularly applicable to the type of conduit comprising telescopic tubes which has been shown, because this arrangement allows reduction of the height of the conduit and consequently of the length of the suspension rod 16. Nevertheless, the device could equally be applied to other types of conduit and the suspension rod, moreover, does not have to be fixed to the lower obturation plate of the conduit, other systems for inflating the seal under the action of an extra weight being conceivable.

What is claimed is:

1. A sealing device for sealing between two tubes which are slidable one in the other and are movable to a position in which one said tube rests on the other said tube, comprising: an inflatable seal disposed in an annular space provided between said two tubes; means for supplying fluid to said seal for inflating and applying said seal under pressure against the walls of said tubes; and means for controlling said means for inflating said seal directly by the force arising from the resting of said one tube on said other tube.

2. A sealing device according to claim 1, comprising at least two abutments each integral with a respective one of said tubes and by which said tubes rest one on the other, said abutments extending into the annular space between said tubes, respectively towards the interior from the outer one of said tubes and towards the exterior from the inner one of said tubes, said means for inflating said seal comprising at least one jack placed between the said abutments and comprising an active chamber connected to the interior of said inflatable seal.

3. A sealing device for sealing the lower end of a conduit for filling a tank with liquid and comprising: at least one tubular element movable vertically along its axis; means for controlling the vertical displacement of said conduit; suspension means connecting said conduit to said control means; an obturation member closing the lower end of said conduit; lateral apertures defined in the lower end of said conduit for passage of the liquid; and a cylindrical casing for closing said apertures, and slidable along said conduit between a closing position in which said casing rests on the end of said conduit and an opening position in which said casing rests on an exterior abutment; wherein said obturation member has a diameter less than the inner diameter of said casing, said casing rests, in said closing position, on an abutment provided at the lower end of said conduit, and said sealing device comprises an inflatable seal arranged on the periphery of said obturation member, means for inflating said seal to apply said seal to the inner wall of said casing and means for detecting an increase in the weight borne by said suspension means when said casing rests on said abutment of said conduit on raising said conduit and for controlling said means for inflating said seal.

4. A sealing device according to claim 3, wherein said means for inflating said seal comprises an hydraulic jack for supplying fluid to said seal, said jack being mounted on said obturation member and connected to the interior of said seal.

5. A sealing device according to claim 3 or claim 4, wherein said means for detecting said increase in weight comprises a connection rod between said suspension means and said obturation member whose upper end is fixed to said suspension means and whose lower end supports said obturation member through the intermediary of a resilient member rated so as to balance the weight of said obturation member and said conduit.

6. A sealing device according to claim 5, wherein said rod forms the rod of the jack for inflating said seal and said resilient member is placed between the piston of said jack and the bottom of the chamber of said jack, and arranged to maintain said piston at the bottom of its stroke under the weight of said conduit alone and when said casing is supported on the tank.

* * * * *